(12) United States Patent
Stahl et al.

(10) Patent No.: US 11,378,309 B2
(45) Date of Patent: Jul. 5, 2022

(54) MULTI-STAGE VORTEX TUBE ASSEMBLY FOR LOW PRESSURE AND LOW FLOW APPLICATIONS

(71) Applicant: B/E Aerospace, Inc., Winston-Salem, NC (US)

(72) Inventors: Peter A. Stahl, Winston-Salem, NC (US); Christopher Wilson, Clemmons, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 483 days.

(21) Appl. No.: 16/595,683

(22) Filed: Oct. 8, 2019

(65) Prior Publication Data

US 2021/0102733 A1    Apr. 8, 2021

(51) Int. Cl.
| F25B 21/02 | (2006.01) |
| F28F 5/00 | (2006.01) |
| F25B 9/04 | (2006.01) |
| B64D 11/06 | (2006.01) |
| F25B 9/00 | (2006.01) |

(52) U.S. Cl.
CPC ............ F25B 9/04 (2013.01); B64D 11/0626 (2014.12); F25B 9/004 (2013.01)

(58) Field of Classification Search
CPC .. A61M 2205/3368; B60R 2021/23153; F25B 9/04
See application file for complete search history.

(56) References Cited

U.S. PATENT DOCUMENTS

| 3,173,273 | A | 3/1965 | Fulton | |
| 3,208,229 | A | 9/1965 | Fulton | |
| 6,119,463 | A * | 9/2000 | Bell | B60N 2/5657 |
| | | | | 62/3.61 |
| 6,505,886 | B2 * | 1/2003 | Gielda | B60N 2/5657 |
| | | | | 297/180.13 |
| RE44,272 | E * | 6/2013 | Bell | 310/58 |
| 10,052,985 | B2 * | 8/2018 | Wolas | B60N 2/5685 |
| 10,077,923 | B2 * | 9/2018 | Suzuki | F25B 1/06 |
| 11,084,404 | B2 * | 8/2021 | Gupta | B60N 2/5642 |
| 2002/0092308 | A1 * | 7/2002 | Bell | B60N 2/5657 |
| | | | | 62/3.7 |

(Continued)

FOREIGN PATENT DOCUMENTS

| DE | 4345137 A1 | 6/1995 |
| DE | 102010012143 A1 | 9/2011 |

(Continued)

OTHER PUBLICATIONS

Extended Search Report for European Application No. 1921667.5 dated Jul. 9, 2020, 2 pages.

*Primary Examiner* — Shin H Kim
(74) *Attorney, Agent, or Firm* — Suiter Swantz pc llo

(57) ABSTRACT

Two-stage vortex tube assemblies including an internal vortex generation chamber for generating a main vortex and a compressed air inlet having a tangential outlet port for creating a pre-vortex in an inflow of compressed air in a direction of flow of the main vortex. The two-stage vortex assemblies may be utilized in low pressure and low flow applications such as seat climatization, local heating or cooling, etc. Further disclosed are seat constructions and seat climatization systems utilizing a two-stage vortex tube as a single source for heating or cooling.

20 Claims, 6 Drawing Sheets

(56) References Cited

U.S. PATENT DOCUMENTS

| | | | |
|---|---|---|---|
| 2002/0145312 A1 | 10/2002 | Gielda et al. | |
| 2007/0025848 A1* | 2/2007 | Shawcross | F04D 29/444 |
| | | | 415/208.2 |
| 2011/0223581 A1* | 9/2011 | Stobbe | F04B 45/0536 |
| | | | 417/44.9 |
| 2015/0305320 A1* | 10/2015 | Hedman | A01M 1/24 |
| | | | 43/132.1 |
| 2015/0330671 A1* | 11/2015 | Suzuki | F25B 41/00 |
| | | | 417/171 |
| 2021/0367482 A1* | 11/2021 | Ma | H01F 27/08 |

FOREIGN PATENT DOCUMENTS

| | | |
|---|---|---|
| EP | 3805665 A1 | 4/2021 |
| RU | 2041432 C1 | 8/1995 |

\* cited by examiner

MULTI-STAGE VORTEX TUBE ASSEMBLY FOR LOW PRESSURE AND LOW FLOW APPLICATIONS

BACKGROUND

Local heating and cooling can be accomplished with various devices configured to move a volume of air. One such device is a vortex tube. Vortex tubes are generally constructed without moving parts and are configured to separate a rotating column of air into hot and cold air streams, the proportions and temperatures of which can be varied over a wide range. In one application, a vortex tube can be utilized to climatize a seat.

Conventional vortex tubes include a single vortex generation chamber. Compressed air entering an air inlet is directed toward the vortex generation chamber to create a rotating column of air and separate the rotating column of air into hot and cold air streams. The hot and cold air streams travel along a length of an air circulating tube coupled to the vortex generation chamber such that hot air travels in an outer vortex in one direction of the tube while cold air travels in an inner vortex in a reverse direction of the tube. Hot air is discharged through one end of the device while cold air is discharged through an opposing end of the device.

In conventional vortex tubes the air inlet is oriented such that compressed air is sprayed perpendicular (i.e., normal) to the longitudinal axis of the vortex generation chamber. This configuration requires high pressure to generate the necessary air speed in the vortex generation chamber to create large temperature differentials and flow rates. While high pressure systems may be acceptable in certain applications such as industrial cooling, high pressure is undesirable applications such as seat climatization.

Accordingly, what is needed is a more efficient vortex tube construction for low pressure and low flow rate applications.

SUMMARY OF THE INVENTIVE ASPECTS

To achieve the foregoing and other aspects, embodiments of the inventive concepts disclosed herein are directed to a vortex tube assembly including a main body having a cylindrical vortex chamber for generating a main vortex, a cylindrical air circulation chamber coaxial with the vortex chamber, and a compressed air inlet coupled in fluid communication to the vortex chamber for generating a pre-vortex in an inflow of compressed air in a direction of flow of the main vortex. The vortex tube further includes a vortex generator disposed in the vortex chamber of the main body, a hot air outlet disposed at a first end of the main body, and a cold air outlet disposed at a second end of the main body.

In some embodiments, the compressed air inlet includes a fluid passageway having an inlet port disposed outside of the vortex chamber, a tangential outlet port disposed in fluid communication with the vortex chamber, and an arcuate portion extending between the inlet port and the tangential outlet port.

In some embodiments, the inlet port and the tangential outlet port are longitudinally spaced along the longitudinal axis of the vortex chamber, the arcuate portion tracks circumferentially around a portion of the main body outside the vortex chamber, and the arcuate portions extends towards the air circulation chamber.

In some embodiments, the main body includes a first portion forming the cylindrical vortex chamber and a second portion forming the air circulation chamber, and wherein the first and second portions are coupled together or are integrally formed.

In some embodiments, the vortex generator includes a body having an axial passageway therethrough and a plurality of veins formed at one end of the body.

In some embodiments, the vortex tube has an operating range less than about 30 psi and less than about 4 CFM.

In some embodiments, the hot air outlet includes an adjusting valve and the cold air outlet includes a nozzle.

In another aspect, embodiments of the inventive concepts disclosed herein are directed to a seat heating and cooling system including a vortex tube, a compressed air source for supplying compressed air to a compressed air inlet of the vortex tube, a manifold assembly having a hot air inlet coupled in fluid communication to a hot air outlet of the vortex tube and a cold air inlet coupled in fluid communication to a cold air outlet of the vortex tube, at least one duct coupled in fluid communication to the manifold assembly for delivery hot or cold air to a seat assembly, and a controller for controlling passage of hot and cold aft flow through the manifold assembly.

In some embodiments, the compressed air inlet of the vortex tube includes a fluid passageway having an inlet port disposed outside a vortex chamber, a tangential outlet port disposed in fluid communication with the vortex chamber, and an arcuate portion extending between the inlet port and the tangential outlet port, wherein the inlet port and the tangential outlet port of the compressed air inlet are longitudinally spaced along the longitudinal axis of the vortex chamber and the arcuate portion tracks circumferentially around apportion of the main body outside the vortex chamber toward the air circulation chamber.

In some embodiments, the seat assembly includes a seat cushion having spacer mesh and a perforated dress cover, and wherein the at least one duct has an end directed hot or cold air into an interior of the spacer mesh to be dispersed through the perforated dress cover.

In some embodiments, the seat cushion is disposed in a backrest and the spacer mesh is disposed in at least one of an upper portion of the backrest and a lower portion of the backrest.

In some embodiments, the seat cushion is disposed in a seat bottom and the spacer mesh is disposed in an upper portion of the seat bottom.

In some embodiments, the manifold operates to supply hot air to the at least one duct, cold air to the at least one duct, and a mix of hot air and cold air to the at least one duct.

In some embodiments, the controller is disposed in the seat assembly or proximate the seat assembly.

In another aspect, embodiments of the inventive concepts disclosed herein are directed to a passenger seat assembly including a cushion having spacer mesh, a vortex tube, a manifold assembly having a hot air inlet coupled in fluid communication to a hot air outlet of the vortex tube and a cold air inlet coupled in fluid communication to a cold air outlet of the vortex tube, at least one duct coupled in fluid communication to the manifold assembly for delivery hot or cold air into an interior of the spacer mesh, and a controller for controlling passage of hot and cold air flow through the manifold assembly.

In some embodiments, the seat assembly includes a source of compressed air or the compressed air inlet is coupled in fluid communication to a source of compressed air apart from the seat assembly.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

The inventive concepts disclosed herein are directed to vortex tube assemblies, passenger seat constructions, and systems for climatizing passenger seats utilizing a vortex tube as a single unit for providing both heating and cooling, among other inventive concepts. The systems disclosed herein are suitable for use in a variety of local environment conditioning applications and therefore find widespread application to passenger vehicles such as aircraft, for example, in premium and economy class aircraft passenger seats, among crew seats and others. The systems and components disclosed herein can be integrated into seat constructions mutually exclusive of adjustment and other capabilities of a seat. The systems according to the present disclosure can be used to condition seat elements as well as other furniture, vehicle environments, etc.

Vortex tube assemblies according to the present disclosure improve on the inefficiencies of conventional vortex tubes by adding a second stage or "pre-vortex" to the main or primary vortex generation. More specifically, whereas conventional vortex tubes introduce compressed air normal (i.e., perpendicular) to the vortex generator veins, vortex tubes according to the present disclosure introduce compressed air tangential to the vortex generator veins, thus allowing the introduced air to maintain momentum (dynamic pressure) as the air passes from the outlet port to the inner veins of the vortex generator. Such a configuration significantly improves the efficiency of the device by eliminating flow restrictions and thereby allowing vortex generation with low pressure and flow rate.

Figure 1:
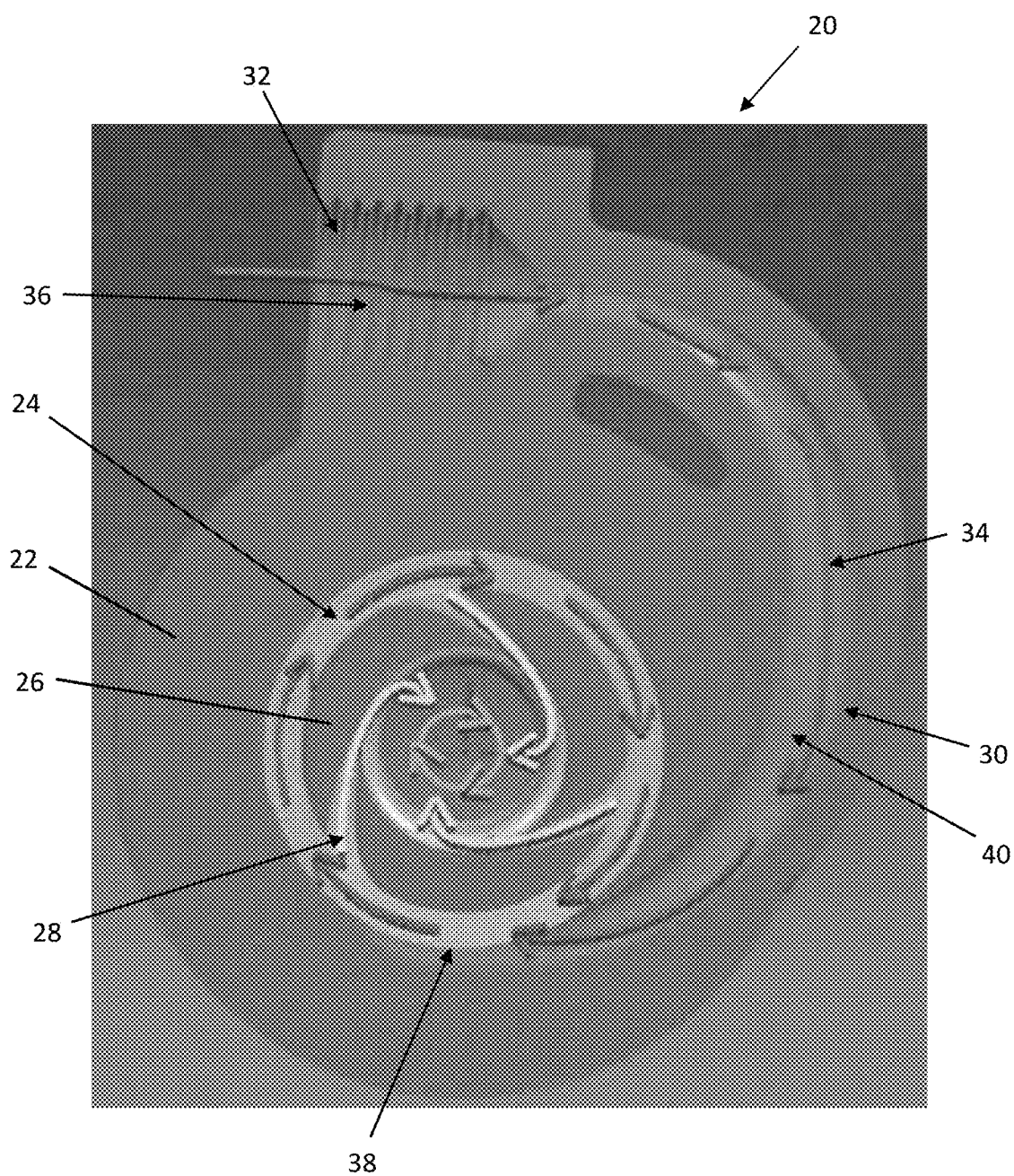
FIG. 1 is a conceptual cross-sectional view of a vortex tube according to the present disclosure illustrating a main vortex and a pre-vortex.
Figure 2:
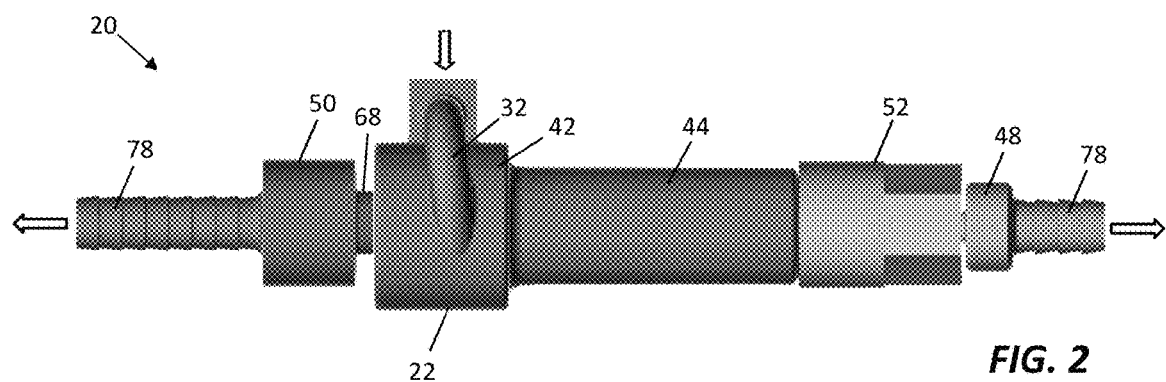
FIG. 2 is a side view of a vortex tube assembly according to the present disclosure.
Figure 3:
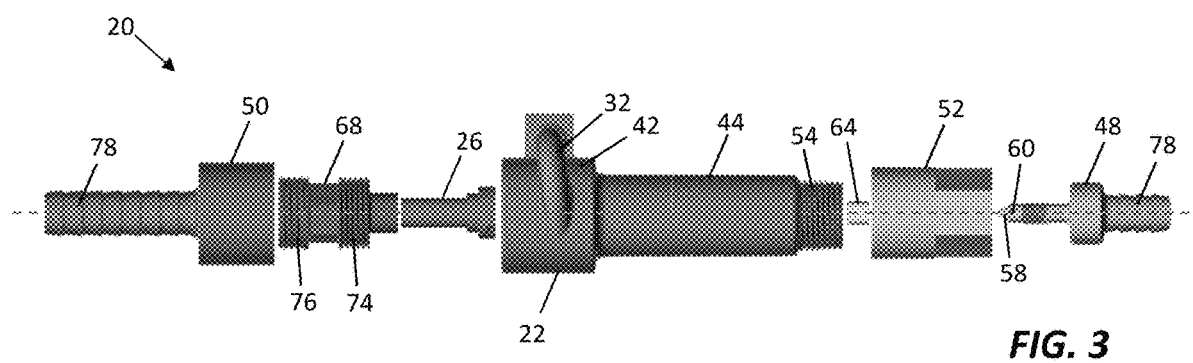
FIG. 3 is an exploded side view of the vortex tube assembly of FIG. 2.
Figure 4:
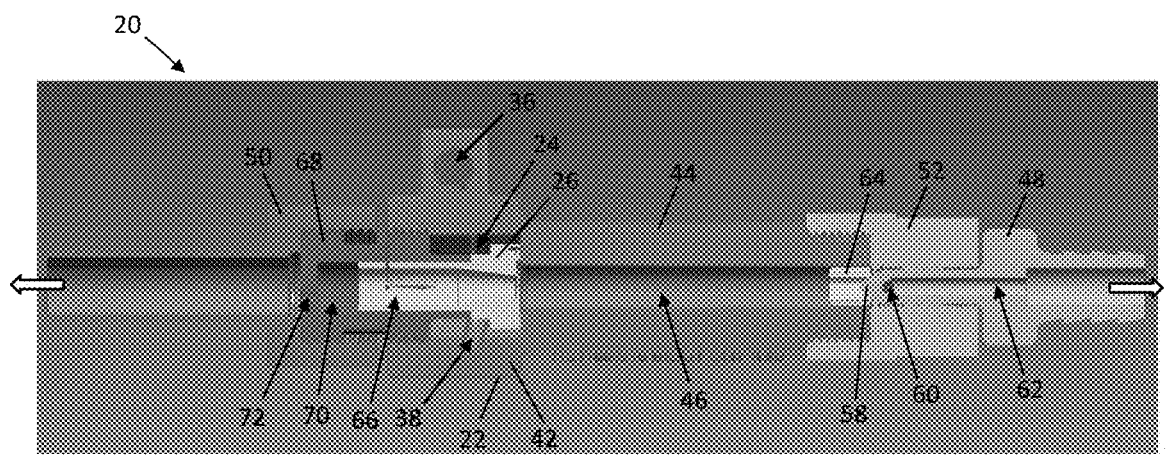
FIG. 4 is a longitudinal cross-sectional view of the vortex tube assembly of FIG. 2.
Figure 5:
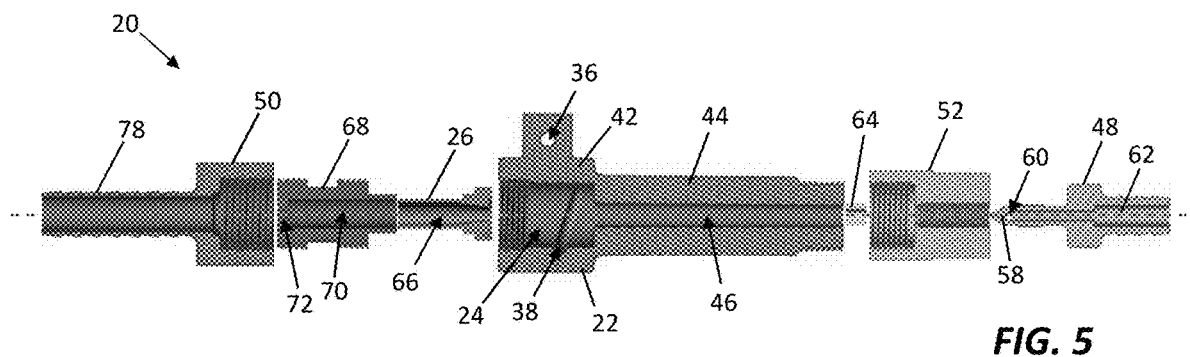
FIG. 5 is an exploded longitudinal cross-sectional view of the vortex tube assembly of FIG. 3.

Referring to FIG. 1, a conceptual illustration of part of a vortex tube assembly according to the present disclosure is shown at reference numeral 20. The vortex tube assembly 20 includes a main body 22 forming the primary or main vortex generation chamber 24 for generating the main vortex. Disposed within the main vortex generation chamber 24 is a vortex generator 26 having vortex generator veins 28 formed at one end thereof. As pressurized air is introduced into the main vortex generation chamber 24, a rotating column of air is created and separated into hot and cold air streams. The main body 22 further includes a pre-vortex generation chamber 30, for example, in the form of a compressed air inlet 32. The compressed air inlet 32 may be coupled to or integrally formed with the main body 22.

The compressed air inlet 32 generally includes a fluid passageway 34 having an inlet port 36 disposed outside of the main vortex generation chamber 24, a tangential outlet port 38 disposed in fluid communication with the main vortex generation chamber 24, and an arcuate portion 40 extending between the inlet port 36 and the tangential outlet port 38. As discussed further below, the inlet port 36 and the tangential outlet port 38 of the compressed air inlet 32 may be longitudinally spaced along the longitudinal axis of the main vortex generation chamber 24 such that the intermediate arcuate portion 40 of the aft inlet tracks circumferentially around apportion of the main body 22 and in a direction toward the air circulation chamber discussed further below. The inlet port 36 may be coupled in fluid communication to a supply of pressurized air, and as shown, may be internally threaded to receive an externally threaded end of a supply conduit supplying a flow of pressurized air from an aft supply.

Based on the angle and orientation of the outlet port 38 tangent to the wall of the main vortex generation chamber 24, pressurized air introduced through the compressed air inlet 32 enters the outer portion of the main vortex generation chamber and flows in the direction of the flow of air within in the main vortex generation chamber, for example clockwise as illustrated in FIG. 1. The flow direction and tangential disposition of the outlet port 40 allows the air speed of the introduced air to be maintained and sustained as the air enters the main vortex generation chamber 24. The increased air speed of the entering air provides for large temperature differentials with reduced pressure (e.g., less than about 30 psi) and flow rate (e.g., less than about 4 cfs) as compared to conventional vortex tube operating pressures and flow rates.

Referring to FIGS. 2-5, the vortex tube assembly 20 is structured around the main body 22. The main body 22 may be formed from a first portion 42 and a second portion 44, wherein the first and second portions may be coupled together or integrally formed as shown. Each of the first and second portions 42, 44 may be cylindrical or have a different shape. The first portion 42 forms the cylindrical main vortex generation chamber 24, while the second portion 44 forms an elongate cylindrical aft circulation tube or chamber 46. The main vortex generation chamber 24 and the air circulation tube 46 are fluidly coupled and axially aligned such that the vortices of air produced in the main vortex generation chamber 24 travel toward and along the length of the air circulation tube 46, with the hot air vortex traveling in an outer vortex in a first direction of the tube (to the right as viewed in FIGS. 2-5) and the cold air vortex traveling in an inner vortex in a reverse direction of the tube (to the left as viewed in FIGS. 2-5).

An adjustment valve 48 is coupled to one end of the main body 22 for discharging hot air. A nozzle 50 is coupled to the opposite end of the main body 22 for discharging cold air. The adjustment valve 48 may be coupled via an internally threaded nut 52, having an axial passage therethrough, that threadably engages an externally threaded end 54 of the second portion 44 of the main body 22. The adjustment valve 48 may have a tip 58 formed at one end with a transverse air inlet 60 near the tip end in fluid communication with an axial passage 62 through the adjustment valve 48. In use, the tip end engages a restrictor 64 such that the tip end can be advanced or withdrawn with respect to the restrictor 62 to control the volume of air flow through the adjustment valve.

The vortex generator 26 is disposed partially within the first portion 42 of the main body 22. More specifically, the end of the vortex generator 26 having the formed veins faces and is in axial alignment with the air circulation tube 46. An axial passage 66 is formed through the length vortex generator 26 to allow cold air to flow therethrough. The end of the vortex generator 26 opposite the formed veins is disposed in a sleeve 68 having an axial passageway 70 therethrough. The sleeve 68 has an internal diameter corresponding to the external diameter of the tube of the vortex generator 26, and an end opening 72. Cold air traveling along the axial passage 66 of the vortex generator 26 travels through the opening 72 and ultimately out an axial passage through the nozzle 50. The sleeve 68 may have first and second spaced external threadings 74, 76, with one threading 74 threadably engaging in the end of the first portion 42 of the main body to capture the vortex generator 26, and the other threading 76 threadably engaging in one end of the nozzle 50 to couple the nozzle to the main body 22. The distal ends of each of the adjustment valve 48 and the nozzle 50 may have gripping barbs 78 for securing a conduit such as a length of tubing as discussed further below.

Figure 6:
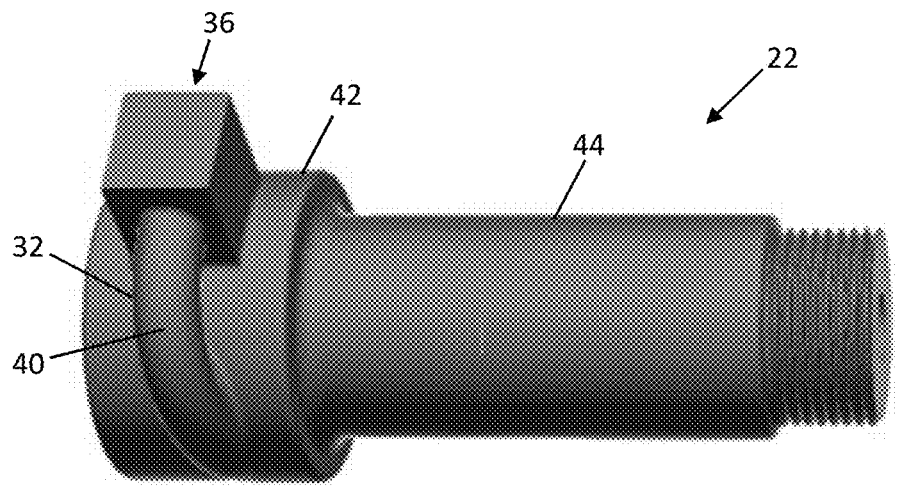
FIG. 6 is a perspective view of a main body of the vortex tube assembly.
Figure 7:
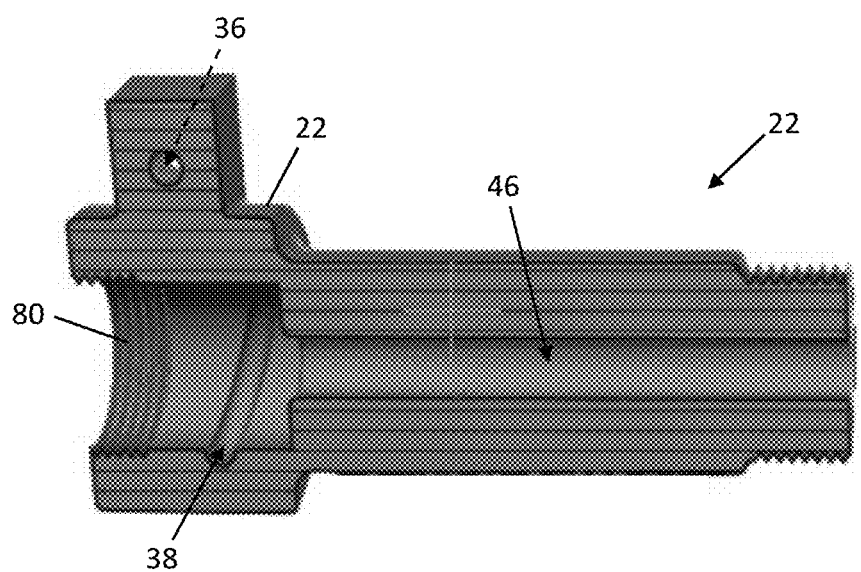
FIG. 7 is a longitudinal cross-sectional view of the main body of FIG. 6.

FIGS. 6 and 7 illustrate a non-limiting example of a one-piece construction for the main body 22. The first portion 42, second portion 44, and the compressed air inlet 32 may be integrally formed, such as molded as a single body. The first and second portions 42, 44 are disposed at opposing ends of the main body 22. As shown, the first portion 42 forms the main vortex generation chamber 24, the compressed air inlet 32, and internal threading 80 for threadably engaging structure, such as the sleeve, to couple the nozzle directly or indirectly to the main body 22. Apparent in FIGS. 6 and 7, the inlet port 36 and tangential outlet port 38 are spaced apart along the longitudinal length of the main vortex generation chamber 24 such that the intermediate arcuate portion 40 extends therebetween. The tangential outlet port 38 is disposed nearer the second portion 44 as compared to the inlet port 36 such that the arcuate portion 40 tracks circumferentially around in the main body toward the second portion 44, and particularly, toward the air circulation tube.

Figure 8:
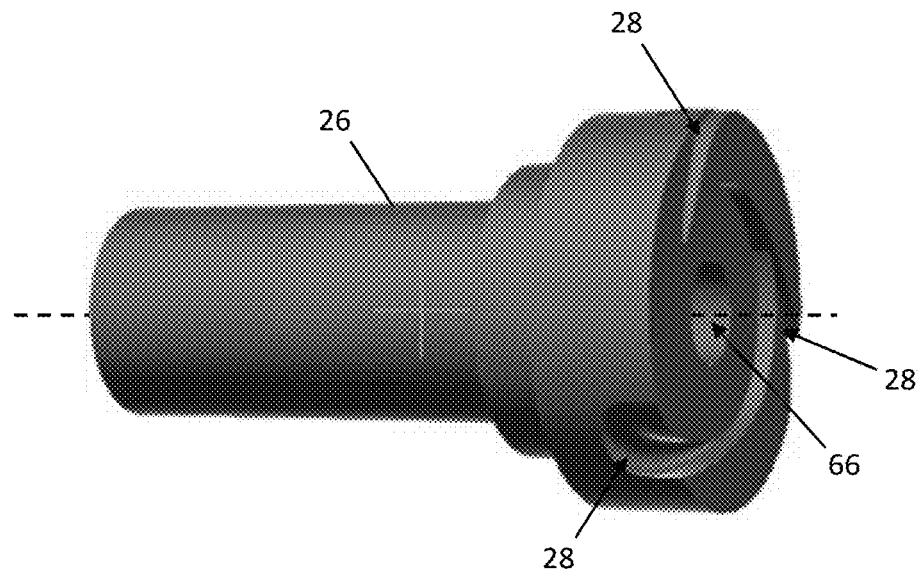
FIG. 8 is a perspective view of a vortex generator of the vortex tube assembly.
Figure 9:
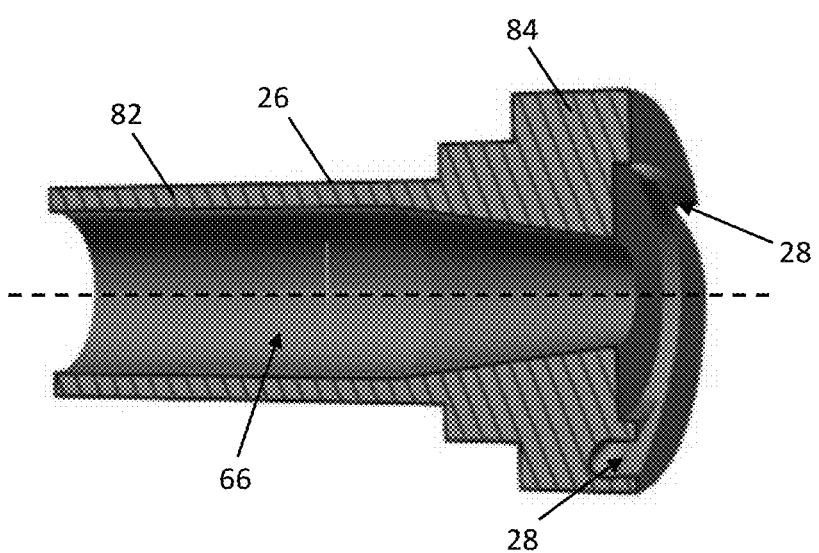
FIG. 9 is a cross-sectional view of the vortex generator of FIG. 8.

FIGS. 8 and 9 illustrate a non-limiting example of a one-piece construction of the vortex generator 26. The vortex generator 26 is an elongate unitary body having a stem 82 formed at one end and an enlarged head 84 formed at an opposing end. The plurality of vortex generator veins 28 are formed in the face of the enlarged head and are disposable in the assembly facing the air circulation tube. The cold air passage 66 extends the longitudinal length of the body and may have a conical taper in the direction of the enlarged head 84.

Figure 10:
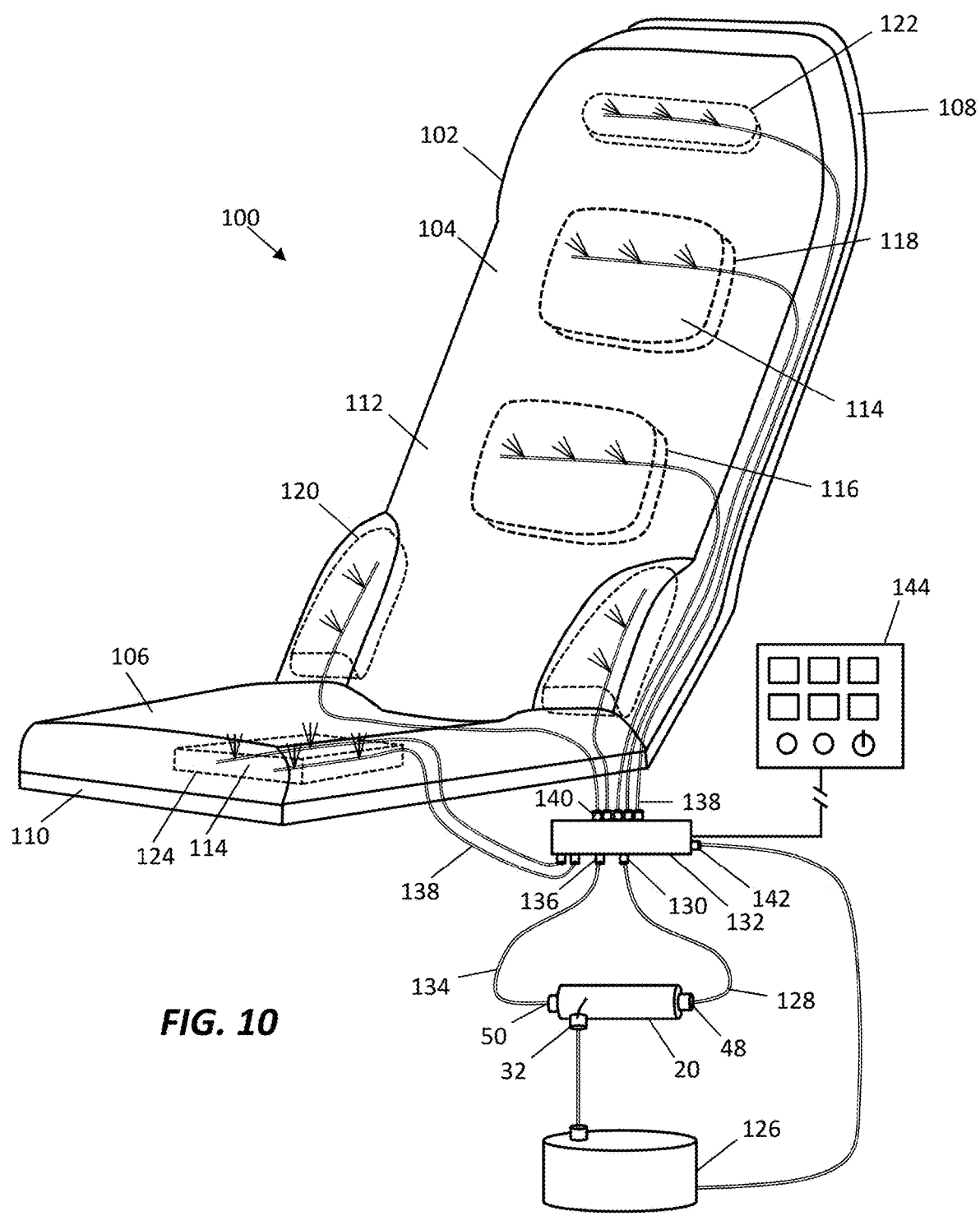
FIG. 10 is a schematic illustration of a seat system heated and cooled using a vortex tube according to the present disclosure.

Referring to FIG. 10, the vortex tube assemblies 20 according to the present disclosure may be utilized in seat climatization application, for example, the seat climatization system shown at reference numeral 100. The system 100 generally includes a seat 102 having a backrest cushion assembly 104 and a seat bottom cushion assembly 106. A backrest structural element 108 supports the backrest cushion assembly 2104. A seat pan 110 or the like supports the seat bottom cushion assembly 106. Each of the backrest structural element 108 and the seat pan 110 may be constructed from rigid materials such as composites to support their respective flexible cushion assembly. Each of the backrest cushion assembly 104 and the seat bottom cushion assembly 106 can be covered with a dress cover 112 for comfort, performance and aesthetics. All or portions of the dress cover 112 can be perforated to release conditioned air from within the cushion assembly through the perforated surface. As shown, perforated portions may correspond to predetermined target areas, for example, perforations may be provided in one or more of upper and lower portions of the front face of the backrest dress cover and a top portion of the seat bottom dress cover.

The construction and configuration of the backrest structural element 108 and the seat pan 110 may vary. For example, the two components may be continuous across the respective back and bottom of the seat or may be skeletal elements supporting a diaphragm. The two components may be pivotally coupled such that the backrest can pivot to relative to the seat bottom to recline the seat. The components may be pivotally coupled to each other or to other frame elements such as seat spreaders. The inclination of the backrest may be adjusted and locked relative to the seat bottom. In an economy class seat construction, for example, a gas compression spring may act between the backrest and the frame with a release positioned in the armrest actuated to unlock the gas spring through a lever and Bowden cable arrangement, among other arrangements. In a premium class seat construction, a control panel may be electrically coupled to one or seat actuators dedicated for driving component adjustability either alone or together to achieve predetermined sitting positions. The systems disclosed herein may operate together with or mutually exclusive of seat adjustment systems.

Each of the backrest cushion assembly 104 and the seat bottom cushion assembly 106 can be constructed using a combination of materials. In some embodiments, the cushion assemblies include one or more layers of open-cell foam and closed-cell flotation foam with optional fire-resistant layers or additives, referred to herein collectively as the "foam" portion of the cushion assembly. Cushion assemblies can optionally include spacer mesh 114 positioned in predetermined areas of the cushion assembly. In some embodiments, spacer mesh may be a three-dimensional mesh like body attached to or embedded within the foam to prevent the spacer mesh from being displaced with respect to the foam body. In some embodiments, the spacer mesh is positioned in ventilated regions of the cushion assembly and the foam is positioned outside of ventilated regions of the cushion assembly. While both the foam and the spacer mesh provide comfort and passenger support, the open-cell structure of the spacer mesh allows better air flow and dispersion therethrough. Some spacer mesh within the cushion assembly may be positioned near a front of the cushion assembly to direct air flow out through the perforated dress cover and across the passenger. Other spacer mesh may be positioned internal to the seat cushion assembly.

Ventilated regions may correspond to surfaces of likely passenger contact. Regarding the backrest cushion assembly 104, for example, spacer mesh may be provided in at least one of a lower backrest or lumbar region 116, an upper backrest region 118, side bolster regions 120, and a headrest region 122. Regarding the seat bottom cushion assembly 106, for example, spacer mesh may be positioned in a top surface of a central region 124 of the seat bottom. While the positioning of the spacer mesh may correspond to regions of the cushion assembly likely to be in passenger contact in different sitting positions, the spacer mesh may also be positioned to one or more the lateral sides and longitudinal ends in embodiments functioning to move air through the cushion assembly in general.

The properties of the foam (e.g., polyurethane foam, soft synthetic resin foam, etc.) may provide better comfort performance as compared to the spacer mesh, while the open-cell structure of the spacer mesh may provide better air flow performance as compared to the foam. Depending on the types of foam and spacer mesh, comfort differences between the two foam types may be imperceptible to the passenger, particularly when positioned beneath a seat dress cover. Each of the foam and the spacer mesh may be formed with contouring and concave portions to conform to passenger anatomy. Portions of the spacer mesh adjacent the foam may be sealed to prevent air leakage. In some embodiments, the face(s) of the spacer mesh facing away from the passenger may be sealed such that air contained in the spacer mesh is directed out through the unsealed face toward the passenger.

Climatization may be incorporated into one or more of the backrest cushion assembly 104 and the seat bottom cushion assembly 106, among other seat elements. A source of pressurized air 126, such as an air compressor or vehicle air system (e.g., vehicle HVAC system), supplies pressurized air to the compressed air inlet 32 of the vortex tube assembly 20. Pressurized air entering the vortex tube 20 is accelerated along the length of the tube and separated into a hot air stream (i.e., air temperature above ambient air temperature) discharged out a first end of the tube through the adjustment valve 48 and a cold air stream (i.e., air temperature below ambient air temperature) discharged out a second end of the tube through the nozzle 50. The adjustment valve 48 is coupled via a first conduit 128, for example a tube, to a hot air inlet 130 of a manifold assembly 132 or the like, and the nozzle 50 is coupled via a second conduit 134, for example a tube, to a cold air inlet 136 of the same manifold assembly. The manifold assembly 132 operates to control the passage and mixing of hot and cold air flow therethrough and can include butterfly valves or the like for mixing hot and cold air together or with ambient air to produce conditioned air, which flows out through a duct or network of conduits 138 for dispersal through the spacer mesh. The manifold assembly 132 may include multiple conditioned air outlets 140, with each outlet coupled in fluid communication to a conduit having a portion of its length embedded in the cushion assembly and a dispersing portion positioned in the spacer mesh. A plurality of openings may be provided along the length of each duct for reducing air pressure of the dispersed conditioned air.

The manifold assembly 132 may further include an air return or exhaust 142 coupled in fluid communication to the source of the pressurized air, the vehicle HVAC system, the cabin environment, or elsewhere. The source of pressurized air 126 may be an air compressor dedicated to the seat climatization system(s). Each seat may be equipped with its own air compressor or multiple seats may draw air from a central compressor. Compressor performance is determinative of the achievable temperature range, with a direct relationship between temperature and pressure. For example, about 5 psi may produce a temperature range from about 62° F. to about 97° F., while about 20 psi may produce a temperature range from about 50° F. to about 150° F. Alternative sources of pressurized air can include, but are not limited to, a pump, aircraft air supply, etc.

In the case of individual dedicated compressors, each the compressor may be located with the seat assembly, such as below the seat pan or backrest structural element. The manifold assembly may be attached directly to the air compressor or may be removed therefrom and coupled in fluid communication thereto with an air conduit, such as an air hose or the like, so that the manifold assembly and the air compressor can be located in two different locations with respect to the seat assembly because of packaging constraints. An electric motor of the air compressor is activated to generate a supply of pressurized air. The air compressor can include a pressure regulator and pressure gauges to control the amount of pressure provided to the manifold assembly. The air compressor may or may not include a small volume air storage tank providing a reservoir for storing air under pressure for immediate seat ventilation performance on demand. In a system including an air storage tank, the air compressor may regularly cycle on and off to replenish the supply of air in the tank when the tank reaches a predetermined low-pressure point. In a system without an air storage tank, the air compressor may activate with a control command to supply air and deactivate with a control command to discontinue supplying air.

The manifold assembly 132 can include a safety pressure release valve for releasing pressure from within the manifold assembly. The manifold assembly 132 generally operates to control and distribute heated or cooled conditioned air to the conduit network(s) 138. The manifold assembly 132 generally includes the hot and cold air inlets 130, 136 coupled in fluid communication to the hot and cold air outlets, such as the adjustment valve 48 and nozzle 50 of the vortex tube assembly 20. Additional outlet ports may be provided on the manifold assembly to provide conditioned air to a second seat or allow for future expansion of the system. A pressure regulator assembly may be incorporated into the manifold assembly including one or more valves opened or closed by actuating the controller to regulate the pressure of the flowing air at the one or more outlet ports. For example, it may be desirable to provide the same or different air flow rates through the backrest and seat bottom. It may also be necessary to provide more air flow to ducts having a long length or bends.

The network of conduits 138 generally includes one or more lengths of air duct, such as air tubing or hose, extending between an outlet port on the manifold assembly and a portion of the cushion assembly. Each length of air conduit may be a direct run or may be split to disperse air different portions of the cushion assembly. The air conduits may be routed through the respective cushion assembly, between the cushion assembly and its respective supporting element, of within passages defined along a face of the supporting element. In some embodiments, passages are formed in a frontside of the structural frame element recessed from a front planar face of the element. Each passage can have a depth corresponding to substantially a thickness of the air hose. In some embodiments, the passages are shaped and directed from an air conduit entry point of the element to a target region in one of the aforementioned target regions, among others. As illustrated, the air conduits can be constructed from rigid tubing section joined together with connectors for providing directional changes. Each air conduit can be open at its distal end, and elsewhere, within the target region to disperse air flow throughout the respective target region.

A controller 144 operates the manifold assembly 132, manually or by electronic control, and in some embodiments also activates the pressurized air supply 126. The controller 144 may be operatively coupled to or an integral part of a passenger seat control interface. The control interface may be located in the seat assembly or in proximity thereto. The control interface may be collocated with the seat control features such that all seat comfort controls are provided in the same passenger accessible device. Ventilation system controls may include, but are not limited to, one or more of activating air flow, adjusting output, selecting a target region (s) to be conditioned, temperature control, etc. Each passenger control interface may be networked with a master crew controller capable of overriding each individual seat controller. For example, all ventilation systems may be deactivated during tax, takeoff and landing and permitted to be selectively activated during flight.

In some embodiments the system includes at least one sensor positioned in the seat assembly communicatively coupled to the controller 144. The sensor may be a temperature sensor, air flow sensor, or both. The sensor may send signals to the controller regarding a sensed condition to provide automatic conditioning in response to exceeding a predetermined threshold value, such as a predetermined threshold temperature. Each sensor may be a device or a subsystem capable of detecting condition changes within the seat assembly and with a processor within or in communication with the controller. The system sensors relay information to the processor where processing logic analyzes the data received to control the system. The processor may be a component of a server, such as a digital computer also including input/output (I/O) interfaces, a network interface, a data store, and memory. The components may be communicatively coupled via a local interface such as one or more buses or other wired or wireless connections. The local interface may have additional elements such as controllers, buffers (caches), drivers, repeaters, and receivers, among others, to enable communications. Further, the local interface may include address, control, and/or data connections to enable appropriate communications among the components.

The processor is a hardware device for executing software instructions such as collation algorithms. The processor may be any custom made or commercially available processor, a central processing unit (CPU), an auxiliary processor among several processors associated with the server, a semiconductor-based microprocessor (in the form of a microchip or chip set), or generally any device for executing software instructions. When the server is in operation, the processor is configured to execute software stored within the memory, to communicate data to and from the memory, and to generally control operations of the server pursuant to the software instructions. The I/O interfaces may be used to receive user input from and/or for providing system output to one or more devices or components such as the described or inferred sensors, an aircraft network, and flight crew devices. I/O interfaces may include a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

A network interface may be used to enable the server to communicate on a network, such as the Internet, a wide region network (WAN), a local region network (LAN) such as the secure aircraft network, and the like, etc. The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server.

The software in memory may include one or more software programs, each of which includes an ordered listing of executable instructions for implementing logical functions. The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described or inferred herein.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A vortex tube, comprising:
   a main body including:
   i. a cylindrical vortex chamber for generating a main vortex;
   ii. a cylindrical air circulation chamber coaxial with the vortex chamber; and
   iii. a compressed air inlet coupled in fluid communication to the vortex chamber for generating a pre-vortex in an inflow flow of compressed air in a direction of flow of the main vortex;
   a vortex generator disposed in the vortex chamber of the main body;
   a hot air outlet coupled to a first end of the main body; and
   a cold air outlet coupled to a second end of the main body.

2. The vortex tube according to claim 1, wherein the compressed air inlet includes a fluid passageway having an inlet port disposed outside the vortex chamber, a tangential outlet port disposed in fluid communication with the vortex chamber, and an arcuate portion extending between the inlet port and the tangential outlet port.

3. The vortex tube according to claim 2, wherein the inlet port and the tangential outlet port are longitudinally spaced along the longitudinal axis of the vortex chamber and the arcuate portion tracks circumferentially around a portion of the main body outside the vortex chamber and toward the air circulation chamber.

4. The vortex tube according to claim 1, wherein the main body includes a first portion forming the cylindrical vortex chamber and a second portion forming the air circulation chamber, and wherein the first and second portions are coupled together or are integrally formed.

5. The vortex tube according to claim 1, wherein the vortex generator includes a body having an axial passageway therethrough and a plurality of veins formed at one end of the body.

6. The vortex tube according to claim 1, having an operating range less than about 30 psi and less than about 4 CFM.

7. The vortex tube according to claim 1, wherein the hot air outlet includes an adjusting valve, and the cold air outlet includes a nozzle.

8. A seat heating and cooling system, comprising:
a vortex tube including:
 i. a main body having a cylindrical vortex chamber for generating a main vortex, a cylindrical air circulation chamber coaxial with the vortex chamber, and a compressed air inlet coupled in fluid communication to the vortex chamber for generating a pre-vortex in an inflow flow of compressed air in a direction of flow of the main vortex;
 ii. a vortex generator disposed in the vortex chamber of the main body;
 iii. a hot air outlet coupled to a first end of the main body; and
 iv. a cold air outlet coupled to a second end of the main body;
a compressed air source for supplying compressed air to the compressed air inlet;
a manifold assembly having a hot air inlet coupled in fluid communication to the hot air outlet of the vortex tube and a cold aft inlet coupled in fluid communication to the cold air outlet of the vortex tube;
at least one duct coupled in fluid communication to the manifold assembly for delivery hot or cold air to a seat assembly; and
a controller for controlling passage of hot and cold air flow through the manifold assembly.

9. The seat heating and cooling system according to claim 8, wherein the compressed aft inlet of the vortex tube includes a fluid passageway having an inlet port disposed outside the vortex chamber, a tangential outlet port disposed in fluid communication with the vortex chamber, and an arcuate portion extending between the inlet port and the tangential outlet port.

10. The seat heating and cooling system according to claim 9, wherein the inlet port and the tangential outlet port of the compressed air inlet are longitudinally spaced along the longitudinal axis of the vortex chamber and the arcuate portion tracks circumferentially around a portion of the main body outside the vortex chamber and toward the air circulation chamber.

11. The seat heating and cooling system according to claim 8, wherein the seat assembly includes a seat cushion having spacer mesh and a perforated dress cover, and wherein the at least one duct has an end directed hot or cold air into an interior of the spacer mesh to be dispersed through the perforated dress cover.

12. The seat heating and cooling system according to claim 11, wherein the seat cushion is disposed in a backrest and the spacer mesh is disposed in at least one of an upper portion of the backrest and a lower portion of the backrest.

13. The seat heating and cooling system according to claim 11, wherein the seat cushion is disposed in a seat bottom and the spacer mesh is disposed in an upper portion of the seat bottom.

14. The seat heating and cooling system according to claim 11, wherein the manifold operates to supply one or more of hot air to the at least one duct, cold air to the at least one duct, and a mix of hot air and cold air to the at least one duct.

15. The seat heating and cooling system according to claim 8, wherein the controller is disposed in the seat assembly or proximate the seat assembly.

16. A passenger seat assembly, comprising:
a cushion including spacer mesh;
a vortex tube including:
 i. a main body having a cylindrical vortex chamber for generating a main vortex, a cylindrical air circulation chamber coaxial with the vortex chamber, and a compressed air inlet coupled in fluid communication to the vortex chamber for generating a pre-vortex in an inflow of compressed air in a direction of flow of the main vortex;
 ii. a vortex generator disposed in the vortex chamber of the main body;
 iii. a hot air outlet coupled to a first end of the main body; and
 iv. a cold air outlet coupled to a second end of the main body;
a manifold assembly having a hot air inlet coupled in fluid communication to the hot air outlet of the vortex tube and a cold air inlet coupled in fluid communication to the cold air outlet of the vortex tube;
at least one duct coupled in fluid communication to the manifold assembly for delivery hot or cold air into an interior of the spacer mesh; and
a controller for controlling passage of hot and cold air flow through the manifold assembly.

17. The seat assembly according to claim 16, wherein the compressed air inlet is coupled in fluid communication to a source of compressed air.

18. The seat assembly according to claim 16, wherein the compressed air inlet of the vortex tube includes a fluid passageway having an inlet port disposed outside the vortex chamber, a tangential outlet port disposed in fluid communication with the vortex chamber, and an arcuate portion extending between the inlet port and the tangential outlet port.

19. The seat assembly according to claim 18, wherein the inlet port and the tangential outlet port of the compressed air inlet are longitudinally spaced along the longitudinal axis of the vortex chamber and the arcuate portion tracks circumferentially around a portion of the main body outside of the vortex chamber and toward the air circulation chamber.

20. The seat assembly according to claim 16, wherein the manifold operates to supply hot air to the at least one duct, cold aft to the at least one duct, and a mix of hot air and cold air to the at least one duct.

* * * * *